United States Patent
Ruble

(10) Patent No.: US 7,539,298 B1
(45) Date of Patent: May 26, 2009

(54) PASSIVE TERMINATION FOR REDUNDANT TELECOMMUNICATION RECEIVERS CONNECTED TO A SINGLE TWISTED PAIR

(75) Inventor: Andrew T. Ruble, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 856 days.

(21) Appl. No.: 10/982,329

(22) Filed: Nov. 5, 2004

(51) Int. Cl.
*H04M 5/00* (2006.01)
*H04M 1/00* (2006.01)

(52) U.S. Cl. .................................. 379/326; 379/413.04

(58) Field of Classification Search ................. 379/166, 379/326, 413.04, 327, 328; 370/354; 439/61, 439/620, 668, 688
See application file for complete search history.

(56) References Cited

U.S. PATENT DOCUMENTS

| | | | | |
|---|---|---|---|---|
| 3,436,488 A | * | 4/1969 | Davis et al. | 379/166 |
| 4,064,373 A | * | 12/1977 | Pinede et al. | 379/164 |
| 4,194,093 A | * | 3/1980 | Davis et al. | 379/162 |
| 5,199,878 A | * | 4/1993 | Dewey et al. | 439/49 |
| 5,530,623 A | * | 6/1996 | Sanwo et al. | 361/788 |
| 5,582,525 A | * | 12/1996 | Louwagie et al. | 439/668 |
| 6,597,689 B1 | * | 7/2003 | Chiu et al. | 370/354 |
| 7,330,543 B2 | * | 2/2008 | Gabrielson et al. | 379/326 |
| 2004/0145847 A1 | * | 7/2004 | Gabrielson et al. | 361/119 |
| 2008/0101587 A1 | * | 5/2008 | Gabrielson et al. | 379/326 |

* cited by examiner

*Primary Examiner*—Binh K Tieu
(74) *Attorney, Agent, or Firm*—Allen, Dyer, Doppelt, Milbrath & Gilchrist, P.A.

(57) ABSTRACT

A wireline termination arrangement bridges a telecommunication wireline pair of a telecommunication system equipment backplane with a termination resistor. The backplane adjoins a plurality of card slots. A first end of the termination resistor installed in the backplane is connected to one wire of the wireline pair, and a second end is connected to a plurality of first terminals on the backplane. The first terminals are engageable by associated first ends of jumper conductors installed on respective ones of a plurality of line cards, when the line cards are installed in the card slots. A plurality of second terminals are arranged adjacent to the first terminals, are connected to the other wire of the wireline pair, and are engageable by second ends of the jumper conductors, when the line cards are installed in the card slots, thereby bridging the wireline pair with the termination resistor.

12 Claims, 2 Drawing Sheets

PASSIVE TERMINATION FOR REDUNDANT TELECOMMUNICATION RECEIVERS CONNECTED TO A SINGLE TWISTED PAIR

FIELD OF THE INVENTION

The present invention relates in general to telecommunication systems and subsystems thereof, and is particularly directed to a circuit arrangement that automatically bridges the receiver end of a telecommunication wireline (tip-ring) pair with a passive termination circuit (e.g., resistor) upon the insertion of a line card into a card insertion slot in a manner that engages the backplane of a telecommunication equipment chassis, but with no card inserted, leaves the tip and ring pair unterminated, so as to prevent a relatively large transient on the wireline from damaging the termination circuit.

BACKGROUND OF THE INVENTION

Present day telecommunication wireline termination circuits for a variety of data communication systems, such as T1 systems, that are implemented as redundant receiver architectures, are typically configured in accordance with one of two commonly used approaches. A first of these, diagrammatically illustrated in FIG. 1, is to hard-wire a termination resistor 10 across the tip-ring leads 21, 22 of a system backplane tip-ring pair, and then wire-OR each receiver circuit of a pair of redundant line cards 31 and 32 to the tip-ring leads. While this scheme is generally acceptable as long as at least one line card is inserted, it can lead to catastrophic system failure when no card is inserted in the backplane, since transient suppression circuitry for protecting against lightning strikes and power fault surges is located on the line cards, rather than the backplane. For example, the occurrence of such a transient event when no line card is inserted will blow the termination resistor, requiring replacement of the entire system, rather than an individual card.

The second approach, diagrammatically illustrated in FIG. 2, involves placing a termination resistor 40 and an associated (such as but not limited to a digitally controlled analog switch, or a relay) switch 45 at the front end of the receiver circuitry 50 of each line card, adjacent to the backplane 55, and then selectively digitally activating the switch on whichever line card is used to terminate the circuit. This switch closure thereby places the termination resistor 40 across the tip-ring pair 70T-70R to which the line card receiver circuitry 50 is coupled.

When using this approach, care must be taken not to close more than one switch, since doing so would place two or more termination resistors in parallel across the tip and ring leads and thereby terminate the line in a lower and wrong value of impedance. Although this second mechanism eliminates the blown resistor problem of the first approach (since the T1 link is no longer terminated if all cards are removed), it can corrupt data during card insertion and removal, and it adds to the cost of a respective line card by requiring that each line card contain a termination resistor and a digitally controlled analog switch.

SUMMARY OF THE INVENTION

In accordance with the present invention, drawbacks of conventional telecommunication line termination arrangements, including those described above, are effectively obviated by connecting one end of a single resistor to one wire of a tip-ring pair and configuring the line card with a jumper wire that is effective to connect the other end of the resistor to the other wire of the tip-ring pair upon insertion of the line card into the backplane. With this new methodology, it does not matter whether one or more than one line card is inserted into the backplane, since each card insertion merely duplicates the effect of a single jumper wire, so that the same termination resistor is used for each line card.

As will be detailed below, the invention involves a two-fold modification of the conventional approach shown in FIG. 2. A first modification is the connection of a first end of a termination circuit (resistor) to one of the tip lead and the ring lead of the receiver circuitry-associated tip-ring pair in the system backplane. A second end of the termination circuit is connected to a plurality of first leads, respective ones of which extend to first end terminals within respective card receiver slots along the back plane. In addition, a first end of a conductor is connected to the other end of the ring lead and the tip lead of the receiver circuitry-associated tip-ring pair in the system backplane. Distributed along the conductor are a plurality of second leads, respective ones of which extend to second end terminals within respective card receiver slots along the back plane. Respective ones of the second end terminals are physically located adjacent to respective ones of the first end terminals within respective card receiver slots along the back plane, so that there is a respective pair of physically adjacent end terminals for each line card.

A second modification of the approach shown in FIG. 2 involves the installation of a jumper on each line card at a location that causes end terminal portions of the jumper to electrically engage or contact an adjacent pair of end terminals of a respective ith line card, when that line card is installed in a respective line card slot of the backplane. This has the effect of placing at least one jumper between the second end of the termination circuit (the first end of which is connected to one of the tip lead and the ring lead of the receiver circuitry-associated tip-ring pair in the system backplane) and the conductor which is connected to the other of the ring lead and the tip lead of the receiver circuitry-associated tip-ring pair in the system backplane. As long as a bridging connection between the second end of the termination circuit and the conductor is provided by a jumper on at least one of the line cards, the tip ring pair in the system backplane will be terminated by the termination circuit, as intended. As such, the addition or removal of a line card will have no effect on the functionality of the termination resistor, as long as at least one other line card remains installed in the backplane.

Removing all of the line cards and thereby all of their jumpers has the effect of opening any connection to the termination resistor, so that the system will no longer be susceptible to large surges during lightning and power testing when all cards are removed. This eliminates having to replace an entire system of the type shown in FIG. 1, which hard-wires a termination resistor across the tip-ring leads of a system backplane, as described above. Moreover, the fact that the bridging of opposite ends of the termination resistor across the tip-ring pair is accomplished by simply inserting a line card obviates the need to install a digitally controlled analog switch on each line card, thereby further reducing costs. The likelihood of the termination resistor failing is relatively low, since it is effectively 'removed' from the backplane when no line cards are installed, yet is protected by the transient protection circuitry on the line cards, when at least one line card is installed in the backplane.

DETAILED DESCRIPTION

Figure 2:
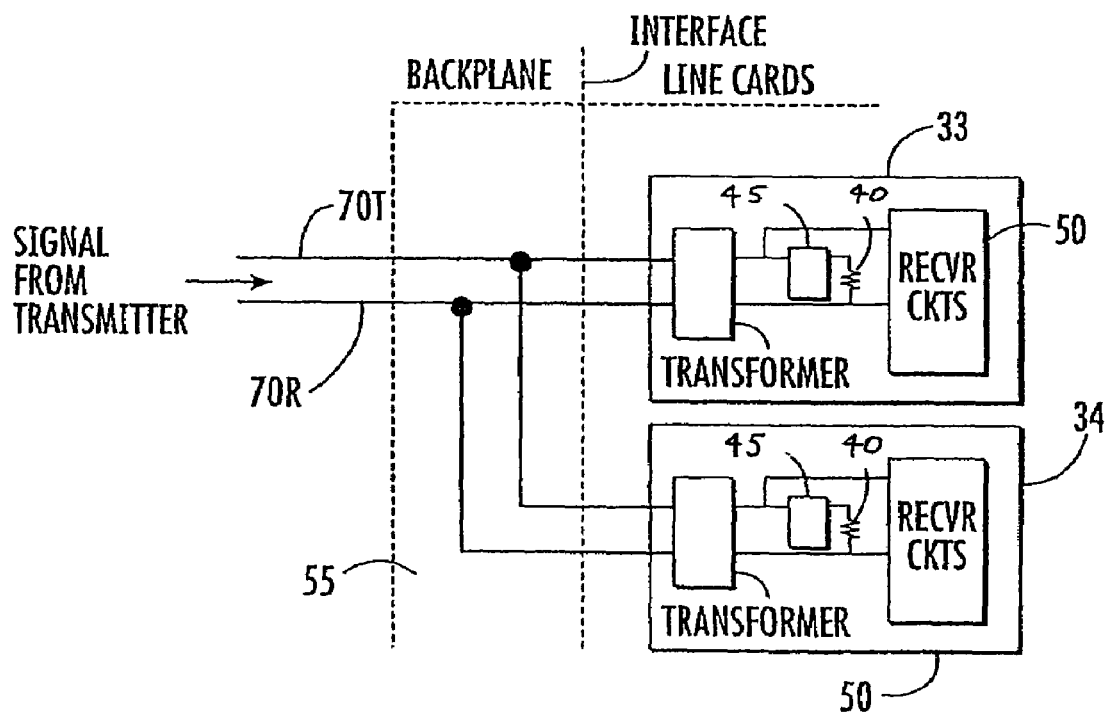
FIG. 2 diagrammatically illustrates a second conventional approach for terminating a data communication system, which involves placing a termination resistor and an associated digitally controlled analog switch on each line card, and then selectively activating the switch on whichever line card is used to terminate the circuit.
Figure 3:
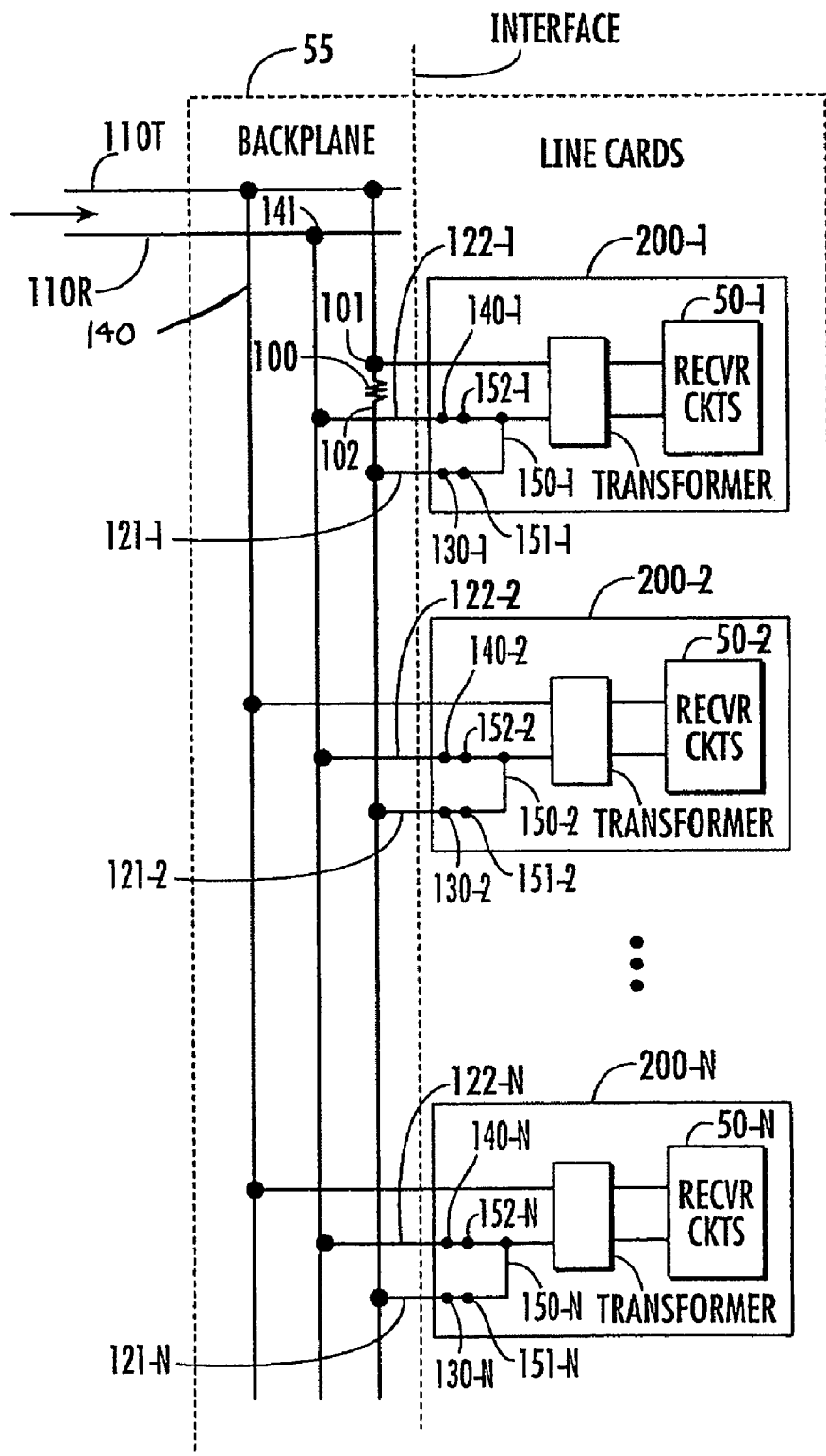
FIG. 3 schematically illustrates an embodiment of the single resistor and jumper wire-based line termination circuit in accordance with the present invention.

Attention is now directed to FIG. 3, wherein an embodiment of the single resistor and jumper wire-based line termination circuit in accordance with the present invention is schematically illustrated. As will be appreciated from an examination of FIG. 3, the present invention involves a two-fold modification of the conventional approach shown in FIG. 2, described above. FIG. 3 shows various connection points to the line card corresponding to 140-1, 152-1, 151-1, 130-1, 140-2, 152-2, 151-2, 130-2, 140-N, 152-N, 151-N, and 130-N. Although these connection points may look like they designate similar wire conductors, the connection points as schematic circuit "dots" are the connection points on a conductor to the line card with the functionality of the line card relative to the single resistor as described below and are shown in the format as displayed in FIG. 3 for purposes of clarity and to make the drawing less complicated and facilitate understanding. With this explanation, it is understood that there are no shorts across 110T and 110R when a line card is inserted in slot 1, slot 2 or slot N. A first modification is the connection of a first end 101 of a passive termination circuit, such as a resistor 100, to one lead (either the tip lead 110T or the ring lead 110R) of the receiver circuitry-associated tip-ring pair 110 in the system backplane 55. In the illustrated embodiment, the first end 101 of resistor 100 is shown as being connected to the ring lead. A second end 102 of the termination resistor 100, rather than being connected to the other of the tip and ring wireline pair, is connected to a plurality of first leads 121, respective ones of which 121-1, 121-2, ..., 121-N extend to first end terminals 130-1, 130-2, ..., 130-N within respective card receiver slots along the backplane.

The first modification further includes connecting a first end 141 of a conductor 140 to the other lead (either the ring lead 110R or the tip lead 110T) of the receiver circuitry-associated tip-ring pair 110 in the system backplane 55. Distributed along conductor 140 are a plurality of second leads 122, respective ones of which 122-1, 122-2, ..., 122-N extend to second end terminals 140-1, 140-2, ..., 140-N within respective card receiver slots along the back plane. Pursuant to the invention, respective ones of the second end terminals 140-1, 140-2, ..., 140-N are physically located adjacent to respective ones of the first end terminals 130-1, 130-2, ..., 130-N within respective card receiver slots along the back plane, so that there is a respective pair of physically adjacent end terminals 130-$i$ and 140-$i$ for each ith line card.

A second modification of the approach shown in FIG. 2 involves the installation of an end terminal jumper 150 on each line card 200 at a location that causes end terminal portions 151 and 152 of the jumper 150 to engage the adjacent pair of end terminals 130-$i$ and 140-$i$ of a respective ith line card, when that line card is installed in a respective line card slot of the backplane 55. In the schematic illustration of FIG. 3, for the three line cards 200-1, 200-2, 200-N shown, respective jumpers 150-1, 150-2, 150-N on those line cards engage and thereby interconnect end terminals 130-1/140-1, 130-2/140-2, 130-N/140-N along the backplane.

This has the effect of placing the three jumpers in a redundant, parallel connection between the second end 102 of the termination resistor 100 (the first end 101 of which is connected to one of the tip lead 110T and the ring lead 110R of the receiver circuitry-associated tip-ring pair 110 in the system backplane 55) and the conductor 140, which is connected to the other of the ring lead 110R and the tip lead 110T of the receiver circuitry-associated tip-ring pair 110 in the system backplane 55.

As long as a bridging connection between the second end 102 of the termination resistor and the conductor 140 is provided by at least one (there are three in the illustrated embodiment, as noted above) of the line cards 200, the tip-ring pair 110 of the system backplane 55 will be terminated by the termination resistor 100, as intended. As such, the addition or removal of a line card will have no effect on the functionality of the termination resistor, as long as at least one other line card remains installed in the backplane.

Figure 1:
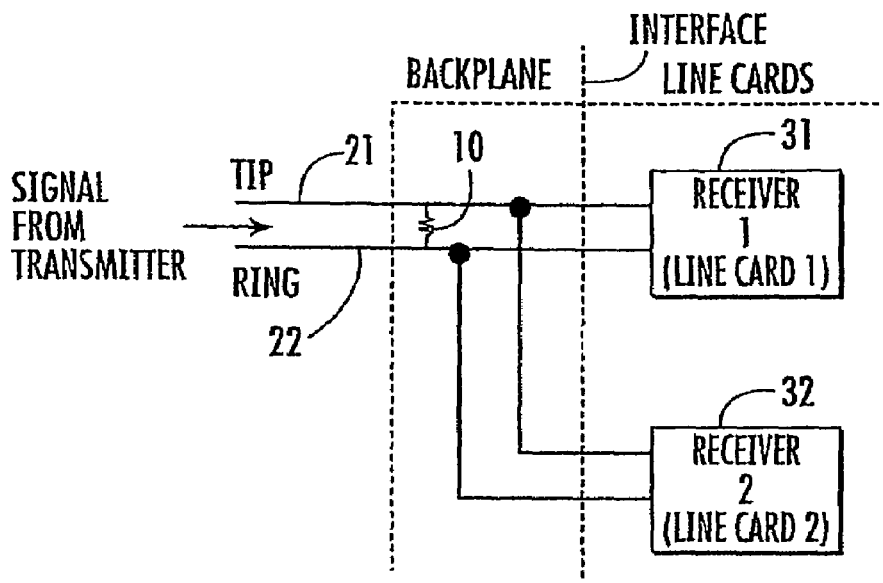
FIG. 1 diagrammatically illustrates a first conventional approach for terminating a data communication system, which hard-wires a termination resistor across the tip-ring leads of a system backplane, and wire-ORs each of a pair of redundant line cards to the tip-ring leads.

Removing all the line cards and thereby all of their jumpers 150 has the effect of opening any connection to the termination resistor, so that the system will no longer be susceptible to large surges during lightning and power testing when all cards are removed. This eliminates having to replace an entire system of the type shown in FIG. 1, which hard-wires a termination resistor across the tip-ring leads of a system backplane, as described above. Moreover, the fact that the bridging of opposite ends of the termination resistor across the tip-ring pair is accomplished merely by installing a line card obviates the need to install a digitally controlled analog switch on each line card, thereby further reducing costs. Finally, the likelihood of the termination resistor failing is relatively low, since it is effectively 'removed' from the backplane when no line cards are installed, yet is protected by the transient protection circuitry on the line cards, when at least one line card is installed in the backplane.

As will be appreciated from the foregoing description, drawbacks of conventional telecommunication line termination arrangements are effectively obviated in accordance with the wireline termination scheme of the present invention which connects one end of a single termination resistor to one wire of a tip-ring pair and installs a jumper wire on the line card, the jumper wire being configured and located to connect the other end of the termination resistor to the other wire of the tip-ring pair upon insertion of the line card into the backplane. With this new arrangement, it does not matter whether one or more than one line card is inserted into the backplane, since each additional card insertion merely duplicates the effect of a single jumper wire, so that the same termination resistor is used for each line card.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. For use with telecommunication system equipment having a backplane and a plurality of card slots in which telecommunication line cards are installed for engagement with said backplane, a method of terminating a telecommunication wireline pair of said backplane comprising the steps of:

(a) connecting a first end of a termination circuit comprising a resistor to one wire of said telecommunication wireline pair;
(b) connecting a second end of said termination circuit to a plurality of first terminals that are adapted to be engaged by associated first ends of jumper conductors installed on respective ones of a plurality of line cards;
(c) connecting another wire of said telecommunication wireline pair to a plurality of second terminals, respective ones of which are adjacent to respective ones of said plurality of first terminals, said second terminals being adapted to be engaged by associated second ends of said jumper conductors installed on respective ones of said plurality of line cards; and
(d) inserting a telecommunication line card into one of said card slots so as to bring first and second ends of a jumper conductor installed on said telecommunication line card into electrical contact with a pair of adjacent first and second terminals, and thereby bridge said telecommunication wireline pair with said termination circuit.

2. For use with telecommunication system equipment having a backplane and a plurality of card slots in which telecommunication line cards are installed for engagement with said backplane, a method for enabling a telecommunication wireline pair of said backplane arrangement to be coupled to a passive circuit termination comprising a resistor therefor, comprising the steps of:
(a) connecting one end of said passive circuit termination to one wire of said wireline pair;
(b) connecting a conductor to another wire of said wireline pair; and
(c) installing, on a telecommunication line card, a jumper wire that is arranged to connect the other end of said passive circuit termination to said conductor and thereby to said another wire of said wireline pair, as a result of insertion of said telecommunication line card into a card slot of said backplane, and thereby bridge said telecommunication wireline pair with said termination circuit.

3. An arrangement for bridging a telecommunication wireline pair of a telecommunication system equipment backplane with a passive termination circuit comprising a resistor, said backplane adjoining a plurality of card slots in which telecommunication line cards are installable for engagement with said backplane, said arrangement comprising:
(a) a passive termination circuit installed on said backplane and having a first end connected to one wire of said telecommunication wireline pair of said backplane, and a second end connected to a plurality of first terminals on said backplane, said first terminals being adapted to be engaged by associated first ends of jumper conductors installed on respective ones of a plurality of line cards, when said plurality of line cards are installed in said plurality of card slots; and
(b) a plurality of second terminals on said backplane, said second terminals being respectively arranged adjacent to said plurality of first terminals, and being connected to another wire of said telecommunication wireline pair, and being adapted to be engaged by associated second ends of said jumper conductors installed on respective ones of said plurality of line cards, when said plurality of line cards are installed in said plurality of card slots, thereby bridging said telecommunication wireline pair with said termination circuit.

4. An arrangement for bridging a telecommunication wireline pair with a passive termination circuit, comprising:
(a) a passive termination circuit comprising a resistor having a first end connected to one wire of said telecommunication wireline pair, and a second end connected to a first terminal, said first terminal being adapted to be engaged by a first end of a jumper conductor installed on a line card, when said line card is installed in a card slot adjacent to said telecommunication wireline pair; and
(b) a second terminal adjacent to said first terminal, and being connected to another wire of said telecommunication wireline pair, and being adapted to be engaged by a second end of said jumper conductor when said line card is installed in said card slot, thereby bridging said telecommunication wireline pair with said termination circuit.

5. A method for providing a termination impedance for a wireline pair with a first and second wire where the wireline is connected to the backplane, the method comprising the steps of:
(a) placing a termination circuit comprising a resistor on the backplane, such that on end of said termination circuit is connected to the first wire of the wireline;
(b) inserting a first line card in the backplane; and
(c) providing a jumper path on the first line card for connecting a second end of the termination circuit to the second wire of the wireline.

6. The method according to claim 5, wherein additional line cards, each with a jumper path, are inserted in the backplane and the jumper paths provide parallel paths to the second end of the termination circuit.

7. The method according to claim 5, wherein said termination circuit is an complex impedance.

8. The method according to claim 5, wherein said line card contains a transceiver.

9. An apparatus for providing a termination impedance for a wireline pair with a first and second wire where the wireline is connected to the backplane, said apparatus comprising:
(a) a termination circuit comprising a resistor on the backplane, wherein one end of said termination circuit is connected to the first wire of the wireline;
(b) a first line card inserted in the backplane; and
(c) a jumper path on the first line card for connecting a second end of the termination circuit to the second wire of the wireline.

10. The apparatus according to claim 9, wherein additional line cards, each with a jumper path, are inserted in the backplane and the jumper paths provide parallel paths to the second end of the termination circuit.

11. The apparatus according to claim 9, wherein said termination circuit is an complex impedance.

12. The apparatus according to claim 9, wherein said line card contains a transceiver.

* * * * *